Dec. 26, 1933.  G. W. VEALE  1,941,331

VEHICLE SPRING

Filed June 1, 1933

INVENTOR:
GEORGE W. VEALE

Kwis Hudson & Kent
ATTORNEYS

Patented Dec. 26, 1933

1,941,331

UNITED STATES PATENT OFFICE 1,941,331

VEHICLE SPRING

George W. Veale, Cleveland Heights, Ohio, assignor to Eaton Manufacturing Company, Cleveland, Ohio, a corporation of Ohio Application June 1, 1933. Serial No. 673,816

3 Claims. (Cl. 267—54)

This invention relates to vehicle springs and, more particularly, to the end construction of multiple-leaf springs.

It is one of the objects of the invention to provide an improved type of multiple-leaf spring that will be especially adapted for use on heavy vehicles, such as trucks and busses, and which will, to a large extent, overcome the difficulties arising from the use of springs in which the eye on the main leaf is rolled up from the metal of the leaf. On account of the severe service to which springs on trucks and busses are subjected, considerable trouble has been experienced because of the breakage of the eye, as ordinarily constructed. My improvement consists, generally, in securing to the end of the spring an eye casting or forging that will be capable of withstanding the service to which it is subjected, without liability of breakage. While I am aware that eye castings have heretofore been used on multiple-leaf springs, I aim to improve upon the constructions heretofore used by providing a more secure method of attaching the eye member without detracting from the flexing characteristics of the spring.

It is a further object of my invention to improve upon prior devices of this nature by so attaching the eye member that it will be retained in position, even though breakage occurs in the main leaf, thereby avoiding the dangers that would be involved in a case of complete detachment of the eye member from the spring, through breakage of any of the leaves.

Other objects of the invention and the features of novelty will be apparent from the following description, taken in connection with the accompanying drawing, of which Figure 1 is a side elevation of the end portion of a spring embodying my invention, certain parts being shown in section on the line 1—1 of Fig. 2;

Figure 2:
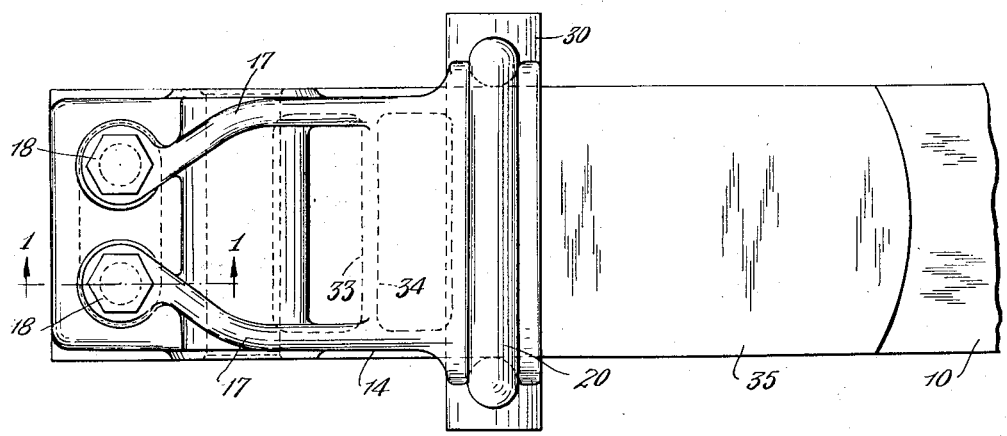
Fig. 2 is a plan view thereof.
Figure 1:
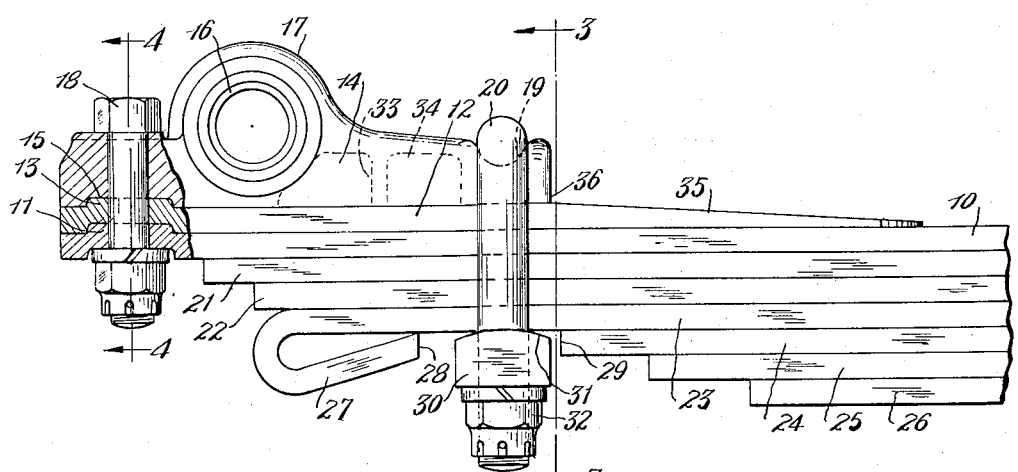
Figure 3:
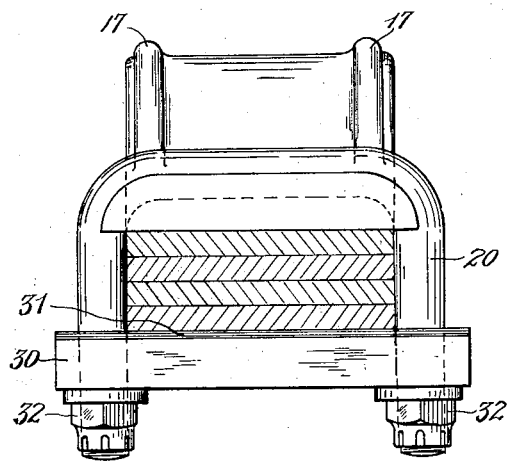
Fig. 3 is a section on the line 3—3 of Fig. 1.
Figure 4:
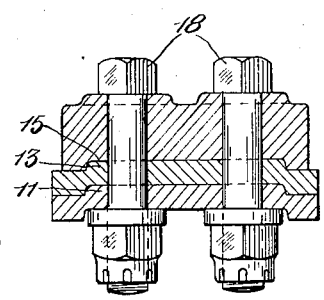
Fig. 4 is a transverse section on the line 4—4 of Fig. 1.

Referring to the drawing, 10 indicates the main leaf of a multiple-leaf spring. Adjacent the end of this leaf there is a stamped-up bead 11 which fits into a recess formed in the adjoining rebound leaf 12 by stamping up the bead 13 in the latter. Mounted on the rebound leaf 12 is an eye member 14 having a recess 15 in its underside to receive the bead 13, as will be best seen from Figs. 1 and 4. The eye member 14 may be made of malleable iron, or cast steel, or it may be a forging and, as shown, is provided with a bushing 16 to receive the pintle by which the end of the spring is connected to the vehicle frame.

The part of the eye member containing the bushing 16 is preferably reinforced by ribs 17 and one or more bolts 18 are provided for the purpose of securing one end of the eye member to the leaves 10 and 12 and to hold the beads 11 and 13 in their recesses. The opposite end of the eye member is provided with an external transverse groove 19 in which a U-bolt 20 is seated. The groove 19 forms a saddle for the U-bolt in which the latter is capable of rocking, to a limited extent, to accommodate the necessary relative movements of the parts.

As illustrated, the spring comprises the reinforcing leaves 21, 22, 23, 24, 25 and 26 and, in accordance with the practice in constructing springs of this kind, the number of these reinforcing leaves will be determined by the service to which the spring is to be subjected. It will be noted that the end portion of the leaf 23 is doubled back upon itself, as indicated at 27, with the end 28 of this leaf spaced from the end 29 of the adjoining leaf 24. A bar 30 extends across the face of the leaf 23, in the space between the ends 28 and 29, and is provided with a concave surface 31 which permits the leaf 23 to freely flex relative to the bar 30. The opposite ends of the bar 30 are perforated to receive the shanks of the U-bolt 20 and the leaves between the eye member 14 and the bar 30 are clamped together by means of the nuts 32 on the U-bolt.

As shown in the drawing, the eye member 14 is in the form of a casting and, to lighten the casting without sacrificing strength, pockets 33 and 34 are formed in the underside of the casting.

The rebound leaf 12 has its exposed inner end tapered, as shown at 35, in order to increase its flexibility and avoid a concentration of stresses in the leaves adjacent the end 36 of the eye member.

From the foregoing description, it will be seen that I have provided an end construction for a multiple-leaf spring that will be substantially as flexible as the common type of spring having the rolled eye integral with the main leaf. In addition, the eye member 14, being in the form of a casting or forging, will be capable of withstanding the service to which it is subjected without liability of breakage. The arrangement of the beads 11 and 13 in their cooperating recesses, provides the requisite strength in the connection between the eye member and the spring leaves and, since the end portion of the main leaf, which contains the bead 11, is not subject to flexure, there will be little or no liability of breakage. However, if for any cause, a breakage should ocur in the main leaf 10, the arrangement of the bar 30, in the space between the ends 28 and 29 of the leaves 23 and 24, respectively, would prevent the eye member from slipping off the end of the spring. Thus there is insured that, even in the case of the breakage of the main leaf, the eye member will remain connected to the spring and thereby avoid the difficulties that would be involved in a case of complete detachment of the end of the spring from the vehicle frame.

While I have illustrated and described what I now consider to be the preferred form of construction for practice of my invention, it will be understood that various changes may be made from the details herein illustrated and described, without departing from the spirit of the invention as defined in the appended claims.

Having thus described my invention, I claim:

1. A vehicle spring comprising a plurality of leaves including a main leaf formed with a stamped-up bead at one end, a rebound leaf formed with a stamped-up bead with which said bead on the main leaf is nested, an eye member mounted on said rebound leaf and having a recess in one end into which said bead on the rebound leaf is fitted, a bolt extending through said beads and securing these parts in nested relation, said eye member being formed with a saddle at its opposite end, a U-bolt seated in said saddle, and a strap on said U-bolt whereby said opposite end of the eye member is secured to said leaves.

2. A vehicle spring comprising a plurality of leaves including a main leaf formed with a stamped-up bead at one end, a rebound leaf formed with a stamped-up bead with which said bead on the main leaf is nested, an eye member mounted on said rebound leaf and having a recess in one end into which said bead on the rebound leaf is fitted, a bolt extending through said beads and securing these parts in nested relation, said eye member being formed with a saddle at its opposite end, a U-bolt seated in said saddle, a strap on said U-bolt having a convex surface engaging one of said leaves, and the end portion of the last mentioned leaf being bent into the plane of the next adjoining leaf, and said strap being positioned between the ends of the two last mentioned leaves.

3. A vehicle spring comprising a plurality of superposed leaves provided with interfitting stamped-up beads at their ends, an eye member mounted on one of said leaves and having a recess into which one of said beads fits, a bolt for securing said ends to said member, said eye member having an external groove at one end, a U-bolt seated in said groove and arranged to prevent relative lateral displacement of said leaves, a bar mounted on said U-bolt and having a convex surface engaging one of said leaves, and nuts on said U-bolt for clamping said leaves between said bar and said eye member.

GEORGE W. VEALE.